US009532189B2

(12) United States Patent
Ogawa et al.

(10) Patent No.: US 9,532,189 B2
(45) Date of Patent: Dec. 27, 2016

(54) INTERCOM SYSTEM, MASTER STATION, AND COMMUNICATION CONTROL METHOD

(71) Applicant: JVC KENWOOD CORPORATION, Yokohama-shi, Kanagawa (JP)

(72) Inventors: Jun Ogawa, Yokohama (JP); Masaru Narui, Yokohama (JP)

(73) Assignee: JVC KENWOOD CORPORATION, Yokohama-Shi, Kanagawa (JP)

( * ) Notice: Subject to any disclaimer, the term of this patent is extended or adjusted under 35 U.S.C. 154(b) by 0 days.

(21) Appl. No.: 14/982,961

(22) Filed: Dec. 29, 2015

(65) Prior Publication Data
US 2016/0198318 A1 Jul. 7, 2016

(30) Foreign Application Priority Data

Jan. 6, 2015 (JP) .................................. 2015-000692

(51) Int. Cl.
| | |
|---|---|
| *H04B 7/14* | (2006.01) |
| *H04W 4/10* | (2009.01) |
| *H04W 4/08* | (2009.01) |
| *H04B 7/155* | (2006.01) |

(52) U.S. Cl.
CPC ............... *H04W 4/10* (2013.01); *H04B 7/155* (2013.01); *H04W 4/08* (2013.01)

(58) Field of Classification Search
USPC .......................................... 455/15, 517–520
See application file for complete search history.

(56) References Cited

U.S. PATENT DOCUMENTS

| 6,405,027 | B1 * | 6/2002 | Bell ...................... H04M 1/725 455/403 |
| 8,200,268 | B2 * | 6/2012 | Benco .................. H04M 11/025 370/259 |
| 8,598,995 | B2 * | 12/2013 | Schuman ............... G08B 5/222 128/903 |
| 2006/0056386 | A1 * | 3/2006 | Stogel ................. H04L 65/1069 370/351 |
| 2008/0155689 | A1 * | 6/2008 | Denninghoff ......... H04L 12/189 726/22 |

FOREIGN PATENT DOCUMENTS

JP          2013-98768 A    5/2013

* cited by examiner

*Primary Examiner* — Fayyaz Alam
(74) *Attorney, Agent, or Firm* — Nath, Goldberg & Meyer; Jerald L. Meyer; Leonid D. Thenor (57) ABSTRACT

A master station of an intercom system is connected to an internal radio. When a substation communicates with an external radio of another wireless system, the master station outputs an audio signal received from the substation to the internal radio, and the internal radio transmits the audio signal to the external radio. The master station stores group setting information of a plurality of substations and destination group setting information indicating to which group of the plurality of substations the audio signal is to be transmitted. With reference to the group setting information and destination group setting information, the master station transmits the audio signal received from the substation to the substations in the group indicated by the destination group setting information.

5 Claims, 10 Drawing Sheets

| GROUP SETTING INFORMATION | GROUP | SUBSTATIONS IN GROUP |
|---|---|---|
| | GpA | 20a1, 20a2 |
| | GpB | 20b1, 20b2 |
| | GpC | 20c1, 20c2 |

| DESTINATION GROUP SETTING INFORMATION | GROUP GpA, GpB |
|---|---|

STORAGE UNIT 15

INTERCOM SYSTEM, MASTER STATION, AND COMMUNICATION CONTROL METHOD

CROSS REFERENCE TO RELATED APPLICATION

This application is based upon and claims the benefit of priority under 35 U.S.C. §119 from Japanese Patent Application No. 2015-000692, filed on Jan. 6, 2015, the entire contents of which are incorporated herein by reference.

BACKGROUND

The present disclosure relates to an intercom system, a master station in the intercom system, and a communication control method used in the intercom system.

Intercom systems which include a master station and a plurality of substations wirelessly connected to the master station are in widespread use. Intercom systems provide communication in a comparatively narrow range and are often used indoors in shops and the like.

In order to implement a wider range of communication while keeping the convenience of intercom systems, an intercom system may be configured to cooperate with another wireless system implementing a wider range of communication than that of intercom systems.

SUMMARY

When a caller, which is one of a plurality of substations, transmits an audio signal to a wireless terminal of another wireless system, an audio signal from the responding wireless terminal may be transmitted to only the caller.

If the caller communicates with a wireless terminal one to one in the intercom system configured to cooperate with another wireless system, users of the substations other than the caller cannot share the contents of the communication, leading to confusion.

A first aspect of the embodiments provides a master station which is provided in an intercom system and is wirelessly connected to a plurality of substations, the master station being connected to an internal radio configured to wirelessly communicate with an external radio provided for a wireless system different from the intercom system. The master station includes: a receiver configured to receive a signal transmitted from any one of the plurality of substations; a transmitter configured to transmit an audio signal to one of the plurality of substations; an audio signal output unit configured to, when a caller, which is one of the plurality of substations, communicates with the external radio via the master station and the internal radio, output to the internal radio, a first audio signal which is transmitted from the caller and received by the receiver; a storage unit configured to store group setting information of the plurality of substations and destination group setting information that indicates to which group in a plurality of groups of the plurality of substations the first audio signal is to be transmitted; and a controller configured to, with reference to the group setting information and the destination group setting information, cause the transmitter to transmit the first audio signal to the substations of the group indicated by the destination group setting information.

A second aspect of the embodiments provides a master station, including: a receiver configured to receive a first audio signal transmitted from a substation of a first wireless communication system, the first audio signal being to be transmitted to a radio of a second wireless communication system that is different from the first wireless communication system; an audio signal output unit configured to output the first audio signal in order to transmit the first audio signal to the radio; an audio signal input unit configured to be inputted a second audio signal from the radio; a transmitter configured to transmit an audio signal to one or a plurality of substations; a storage unit configured to store information for identifying one or the plurality of substations; a controller configured to, when the second audio signal is inputted to the audio signal input unit, cause the transmitter to transmit the second audio signal to one or the plurality of substations which are identified by the information stored in the storage unit, and configured to, when the receiver receives the first audio signal, cause the audio signal output unit to output the first audio signal, and cause the transmitter to transmit the first audio signal to one or the plurality of substations which are identified by the information stored in the storage unit.

A third aspect of the embodiments provides an intercom system including: a master station; and a plurality of substations wirelessly connected to the master station, in which the master station is connected to an internal radio configured to wirelessly communicate with an external radio provided for a wireless system different from the intercom system. The master station includes: a first receiver configured to receive a signal transmitted by any one of the plurality of substations; a first transmitter configured to transmit an audio signal to one of the plurality of substations; an audio signal output unit configured to, when a caller, which is one of the plurality of substations, communicates with the external radio via the master station and the internal radio, output to the internal radio, a first audio signal which is transmitted from the caller and received by the receiver; a storage unit storing group setting information of the plurality of substations and destination group setting information that indicates to which group in a plurality of groups of the plurality of substations the first audio signal is to be transmitted; and a controller configured to, with reference to the group setting information and the destination group setting information, cause the first transmitter to transmit the first audio signal to the substations of the group indicated by the destination group setting information.

DETAILED DESCRIPTION

Hereinafter, a description is given of an intercom system, a master station, a communication control method according to at least one embodiment with reference to the accompanying drawings. The intercom system employs a first wireless communication method, and another wireless system described later employs a second wireless communication method.

Figure 1:
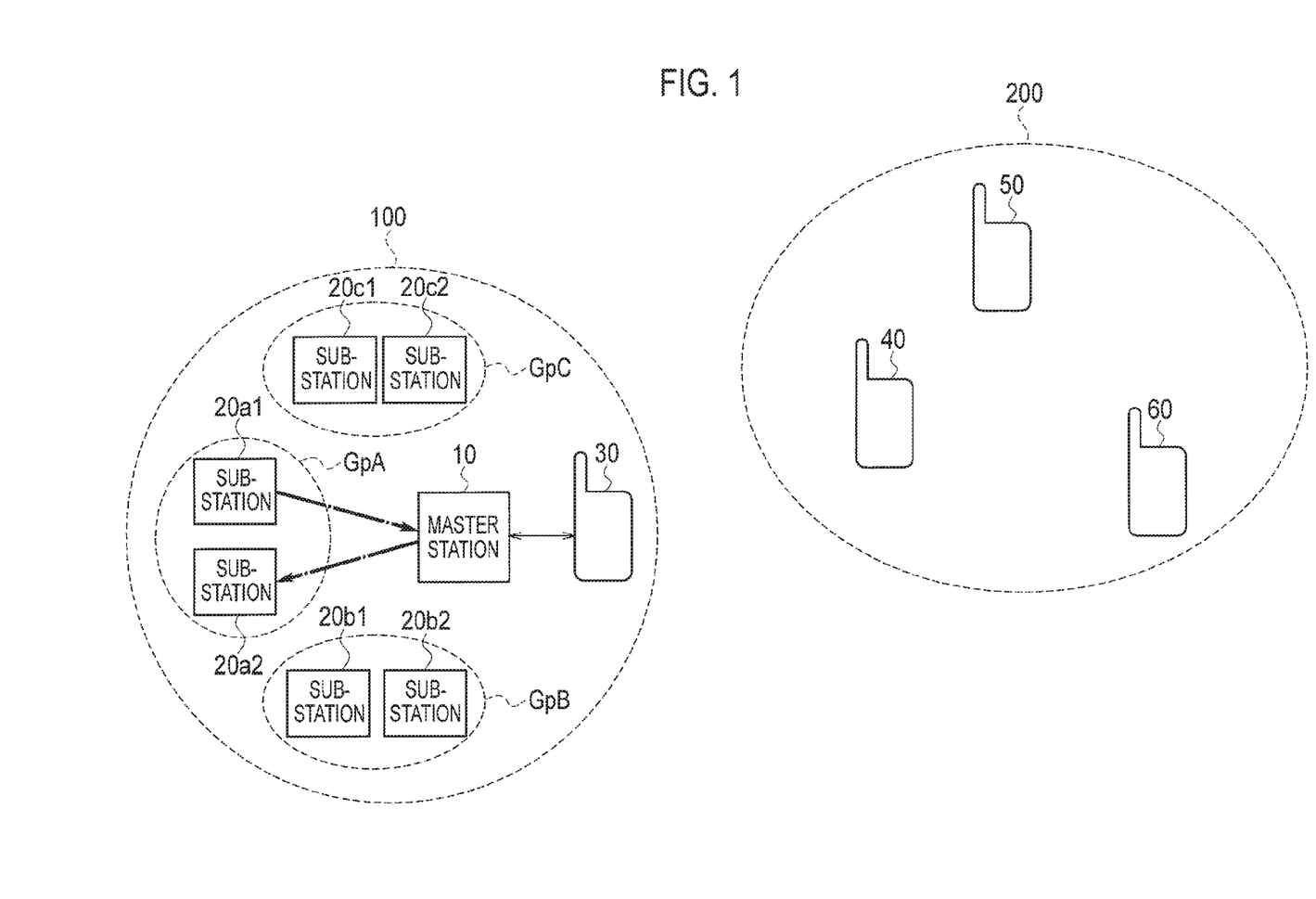
FIG. 1 is a block diagram illustrating the entire configuration of an intercom system according to at least one embodiment.

In FIG. 1, there is an intercom system 100 and a wireless system 200 as another wireless system, which is different from the intercom system 100. The intercom system 100 provides communication within a comparatively narrow range. The maximum range of communication of the wireless system 200 is wider than that of the intercom system 100.

The intercom system 100 includes a master station 10 and substations 20a1, 20a2, 20b1, 20b2, 20c1 and 20c2. The substations 20a1, 20a2, 20b1, 20b2, 20c1 and 20c2 are collectively referred to as substations 20, or any unspecified one thereof is referred to as a substation 20. The master station 10 sends digital audio signals to the substations 20 and receives digital audio signals from the substations 20 in full-duplex communication.

The master station 10 is configured to connect to a radio which is usable in the wireless system 200. The master station 10 is connected to the radio 30 by wire.

When the master station 10 is connected to the radio 30, the master station 10, substations 20 and radio 30 constitute the intercom system 100. The radio 30 is located within the intercom system 100 and is referred to as an internal radio 30.

The wireless system 200 includes a plurality of radios 40, 50 and 60 as wireless terminals used in the wireless system 200. The internal radio 30 is also a wireless terminal used in the wireless system 200. The number of radios included in the wireless system 200 may be one. The radios 40 to 60 are located outside of the intercom system 100 and are referred to as external radios 40 to 60.

The internal radio 30 sends audio signals to the external radios 40 to 60 and receives audio signals from the external radios 40 to 60 in half-duplex communication, for example. The wireless system 200 may be a wireless system using a mobile telephone network that employs full-duplex communication.

When the wireless system 200 is a wireless system employing half-duplex communication, the wireless system 200 does not incur communication costs unlike a wireless system using a mobile telephone network. Accordingly, it is preferable that the wireless system 200 is a wireless system employing half-duplex communication.

The wireless system 200 may include a base station or a repeater, which are not illustrated.

The intercom system 100 may be installed either outdoors or indoors. It is assumed that users holding the external radios 40 to 60 are located away from the range of communication of the intercom system 100.

Figure 2:
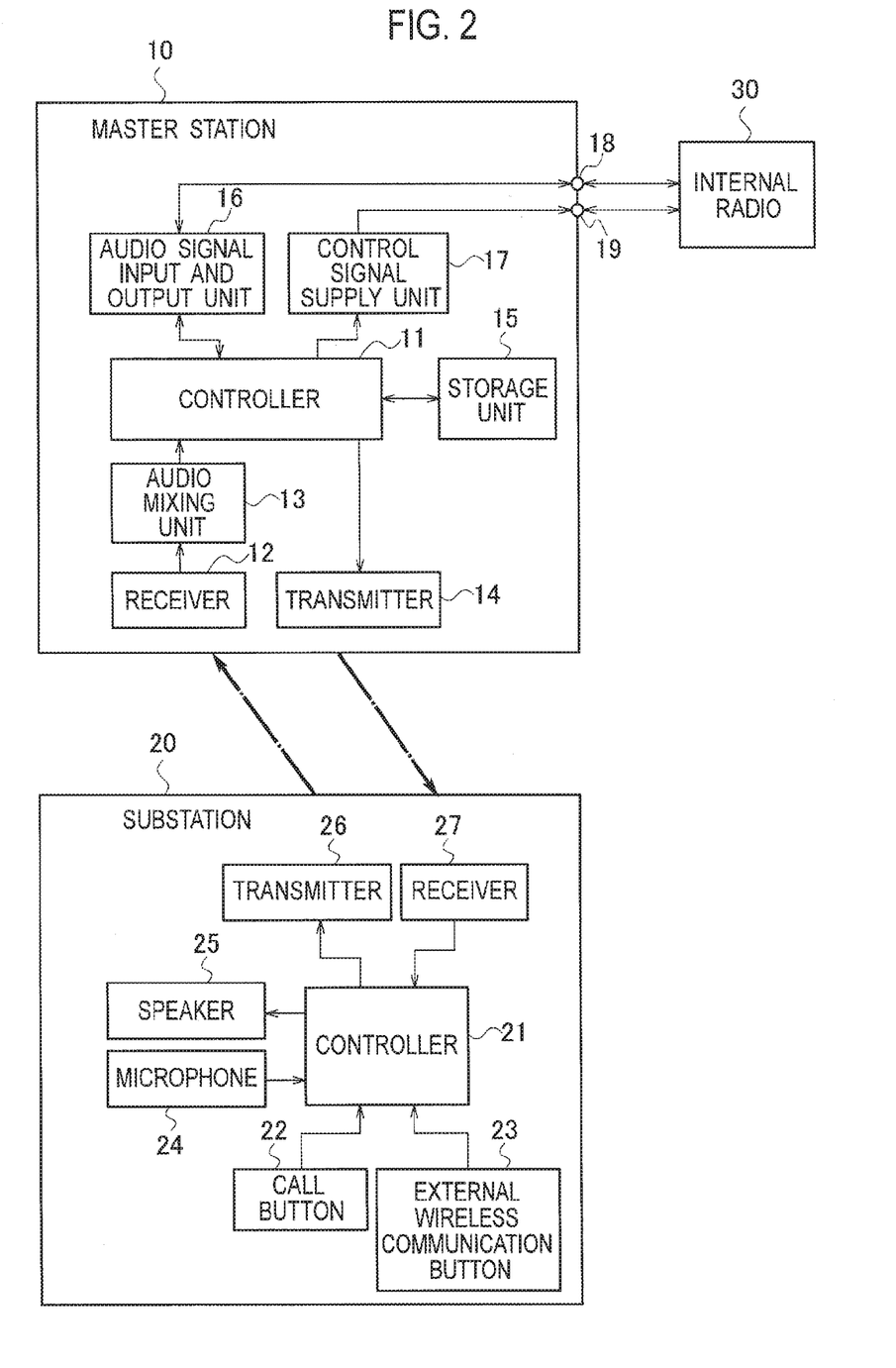
FIG. 2 is a block diagram illustrating specific configuration examples of a master station and a substation constituting the intercom system according to the embodiment.

FIG. 2 illustrates specific configuration examples of the master station 10 and substations 20. As illustrated in FIG. 2, the master station 10 includes a controller 11, a receiver 12, an audio mixing unit 13, a transmitter 14, a storage unit 15, an audio signal input and output unit 16, a control signal supply unit 17, an audio signal input and output terminal 18, and a control signal output terminal 19.

The controller 11 can be composed of a microprocessor or a microcomputer. The receiver 12 and transmitter 14 are composed of a receiving circuit, a transmitting circuit, and a transmitting and receiving antenna. The audio mixing unit 13, audio signal input and output unit 16, and control signal supply unit 17 are composed of an audio mixing circuit, an audio signal input and output circuit, and a control signal supply circuit, respectively.

In the audio signal input and output unit 16, an audio signal input section and an audio signal output section may be separately configured or integrally configured. The audio signal input and output unit 16 includes an analog-to-digital converter and a digital-to-analog converter in some cases.

The storage unit 15 can be composed of a non-volatile memory such as an EEPROM.

Each substation 20 includes a controller 21, a call button 22, an external wireless communication button 23, a microphone 24, a speaker 25, a transmitter 26, and a receiver 27.

The controller 21 can be composed of a microprocessor or a microcomputer. The transmitter 26 and receiver 27 are composed of a receiving circuit, a transmitting circuit, and a transmitting and receiving antenna.

First, a description is given of a schematic operation of the substations 20. When the user presses the call button 22 and emits sound, the controller 21 causes the transmitter 26 to transmit to the receiver 12, a digital RF signal including an audio signal based on the sound picked up by the microphone 24.

When the receiver 27 receives a digital RF signal including an audio signal from the transmitter 14, the controller 21 supplies the audio signal to the speaker 25. The speaker 25 outputs sound based on the supplied audio signal.

The external wireless communication button 23 is provided to set the substation 20 to an external wireless transmission mode. In the external wireless transmission mode, an audio signal from the substation 20 is transmitted to one or some of the external radios 40 to 60 via the master station 10 and internal radio 30.

When the external wireless communication button 23 is not pressed, the substation 20 is in a normal mode. When the external wireless communication button 23 is pressed, the controller 21 causes the transmitter 26 to transmit the external wireless communication control signal to the receiver 12. The substation 20 is thereby set to the external wireless transmission mode.

When the external wireless communication button 23 is pressed again, the controller 21 causes the transmitter 26 to transmit an external wireless communication termination control signal to the receiver 12. The substation 20 is released from the external wireless transmission mode and is set to the normal mode.

When the transmitter 26 transmits an audio signal to the receiver 12, packets including the audio signal are transmitted as a wireless signal. When the transmitter 26 transmits a control signal (the external wireless communication control signal or external wireless communication termination control signal) to the receiver 12, packets including the control signal are transmitted as a wireless signal.

Next, a description is given of a schematic operation of the master station 10. The receiver 12 receives a digital RF signal transmitted from the transmitter 26. The digital RF signal includes an audio signal or a control signal as described above.

When a plurality of substations 20 in an identical group described later transmit audio signals, the audio mixing unit 13 combines the audio signals received by the receiver 12.

When one of the substations 20 of a group transmits an audio signal for a group call, the transmitter 14 transmits the audio signal received by the receiver 12 to the other substations 20 in the same group.

When some of the substations 20 in an identical group transmit audio signals for a group call, the transmitter 14 transmits to the other substations 20 in the same group, an audio signal obtained by the audio mixing unit 13 combining the audio signals received by the receiver 12.

As described in detail later, when any one of the substations 20 serves as a caller and transmits an audio signal to communicate with one or some of the external radios 40 to 60 via the master station 10 and internal radio 30, the transmitter 14 transmits the audio signal received by the receiver 12 to the substations 20 in a certain group.

In the case where the plurality of substations 20 are allowed to simultaneously serve as a caller and communicate with the external radios 40 to 60, the transmitter 14 transmits to the substations 20 in a certain group, an audio signal obtained by the audio mixing unit 13 combining the audio signals.

When the external radios 40 to 60 transmit an audio signal to the internal radio 30, the transmitter 14 transmits to the substations 20 in a certain group, the audio signal inputted from the internal radio 30 to the master station 10.

Figure 3:
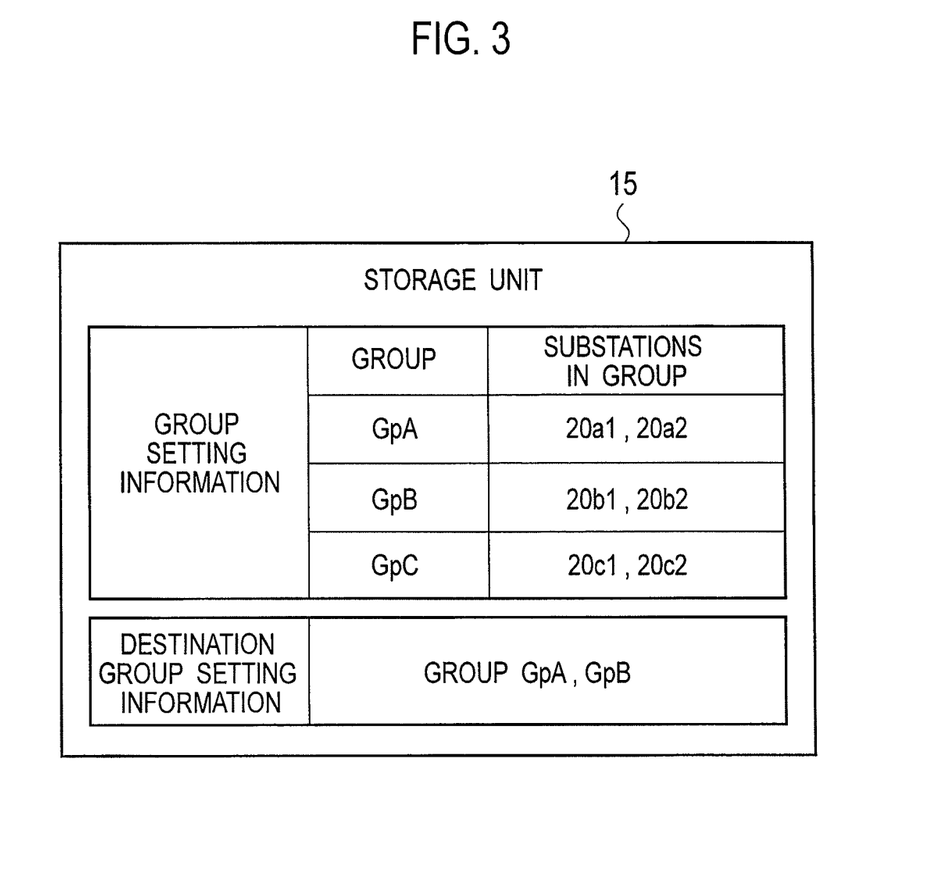
FIG. 3 is a table illustrating examples of group setting information and destination group setting information which are stored in a storage unit included in the master station in the intercom system according to the embodiment.

The controller 11 is connected to the storage unit 15. The controller 11 may have the same function as the storage unit 15. As illustrated in FIG. 3, the storage unit 15 stores group setting information and destination group setting information. The storage unit 15 also stores the current mode of the master station 10.

The group setting information indicates which substations 20 are included in each group.

A group GpA includes the substations 20a1 and 20a2 as the members thereof. A group GpB includes the substations 20b1 and 20b2 as the members thereof. A group GpC includes the substations 20c1 and 20c2 as the members thereof.

Each substation 20 has identification information for uniquely identifying the same substation 20. The group setting information includes identification information of the substations 20 of each group.

In FIG. 1, the substations 20 in each of the groups GpA, GpB and GpC are surrounded by dashed ellipses.

The destination group setting information indicates a destination group to which an audio signal received from the external radios 40 to 60 is to be transmitted by the transmitter 14 when the external radios 40 to 60 communicate with the substations 20. In other words, the substations in a group set for the destination group setting information include one or a plurality of substations 20 set as the destination of an audio signal which is received from the external radios 40 to 60.

In the embodiment, the destination group setting information is also used as information indicating a destination group to which the transmitter 14 transmits an audio signal transmitted from the substations 20 when the substations 20 communicate with the external radios 40 to 60.

In the example illustrated in FIG. 3, the groups GpA and GpB are set for the destination group setting information.

Returning back to FIG. 2, when the substations 20 and the external radios 40 to 60 communicate with one another, the audio signal input and output unit 16 outputs to the audio signal input and output terminal 18 an audio signal which is transmitted from the substation 20 and then received by the receiver 12.

The audio signal input and output unit 16 performs digital-to-analog conversion of a digital audio signal and outputs an analog audio signal to the audio signal input and output terminal 18. The analog audio signal is supplied from the audio signal input and output terminal 18 to the internal radio 30.

The audio signal input and output unit 16 may be configured to supply a digital audio signal directly to the internal radio 30 without converting the same.

When receiving the external wireless communication control signal, the controller 11 sets the master station 10 in the normal mode to the external wireless transmission mode. The controller 11 causes the storage unit 15 to store the setting of the master station 10 being in the external wireless transmission mode. The controller 11 may be configured to store the setting of the master station 10 being in the external wireless transmission mode.

When the master station 10 is set to the external wireless transmission mode, the controller 11 generates a PTT press control signal to put the internal radio 30 into the same state as that when a push-to-talk (PTT) button provided for the internal radio 30 is pressed. The control signal supply unit 17 outputs the PTT press control signal to the control signal output terminal 19. The PTT press control signal is supplied from the control signal output terminal 19 to the internal radio 30.

The internal radio 30 performs analog-to-digital conversion of an inputted analog audio signal. Upon receiving the PTT press control signal, the internal radio 30 is put into the same state as that when the PTT button is pressed. The internal radio 30 is therefore capable of transmitting a digital audio signal to one or some of the external radios 40 to 60.

Upon receiving the external wireless communication termination control signal, the controller 11 returns the master station 10 to the normal mode and causes the storage unit to store the setting of the master station 10 being in the normal mode.

When the master station 10 is switched from the external wireless transmission mode to the normal mode, the controller 11 generates a PTT release control signal to put the internal radio 30 into the same state as that when the PTT button is released. The control signal supply unit 17 outputs the PTT release control signal to the control signal output terminal 19. The PTT release control signal is supplied from the control signal output terminal 19 to the internal radio 30.

The internal radio 30 is put into the same state as that when the PTT button is released. The internal radio 30 is therefore unable to transmit a digital audio signal to the external radios 40 to 60.

Figure 4A:
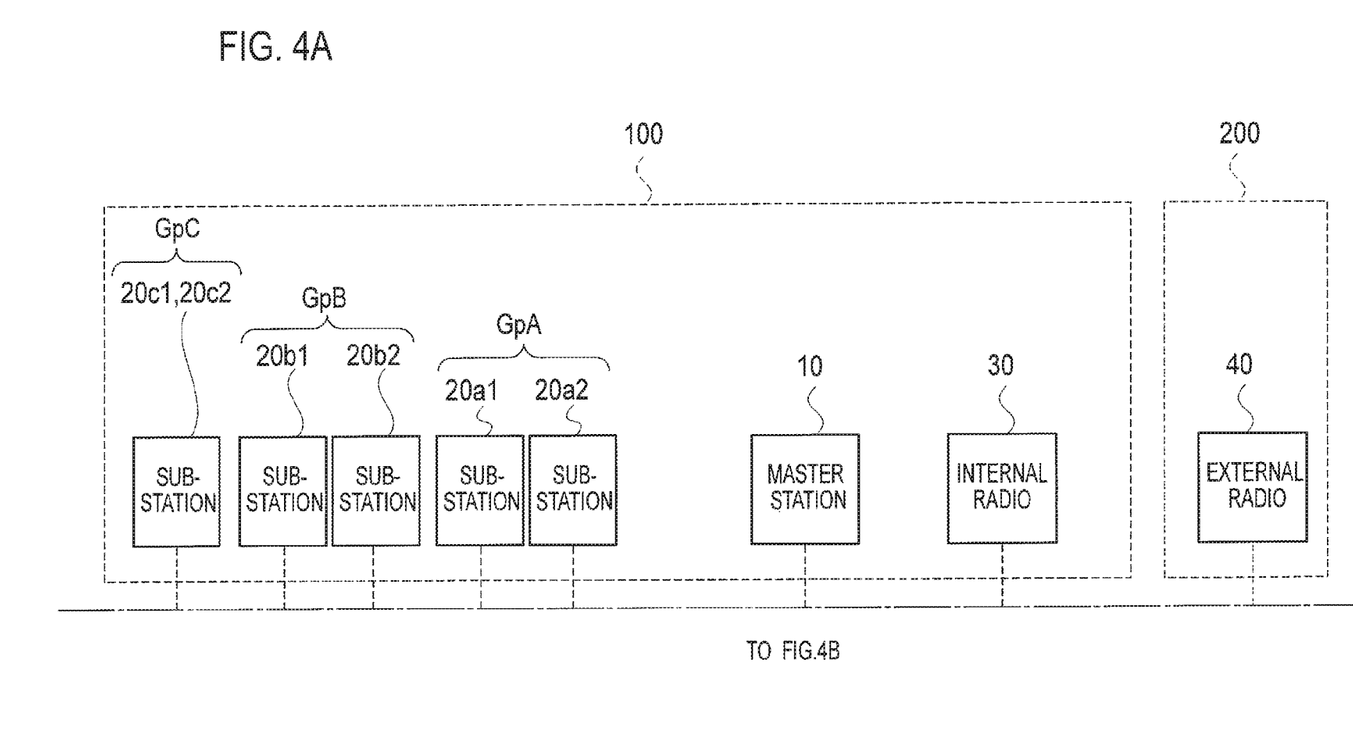
FIGS. 4A, 4B and 4C are a sequence diagram illustrating operations executed in the intercom system and a communication control method according to the embodiment.
Figure 4B:
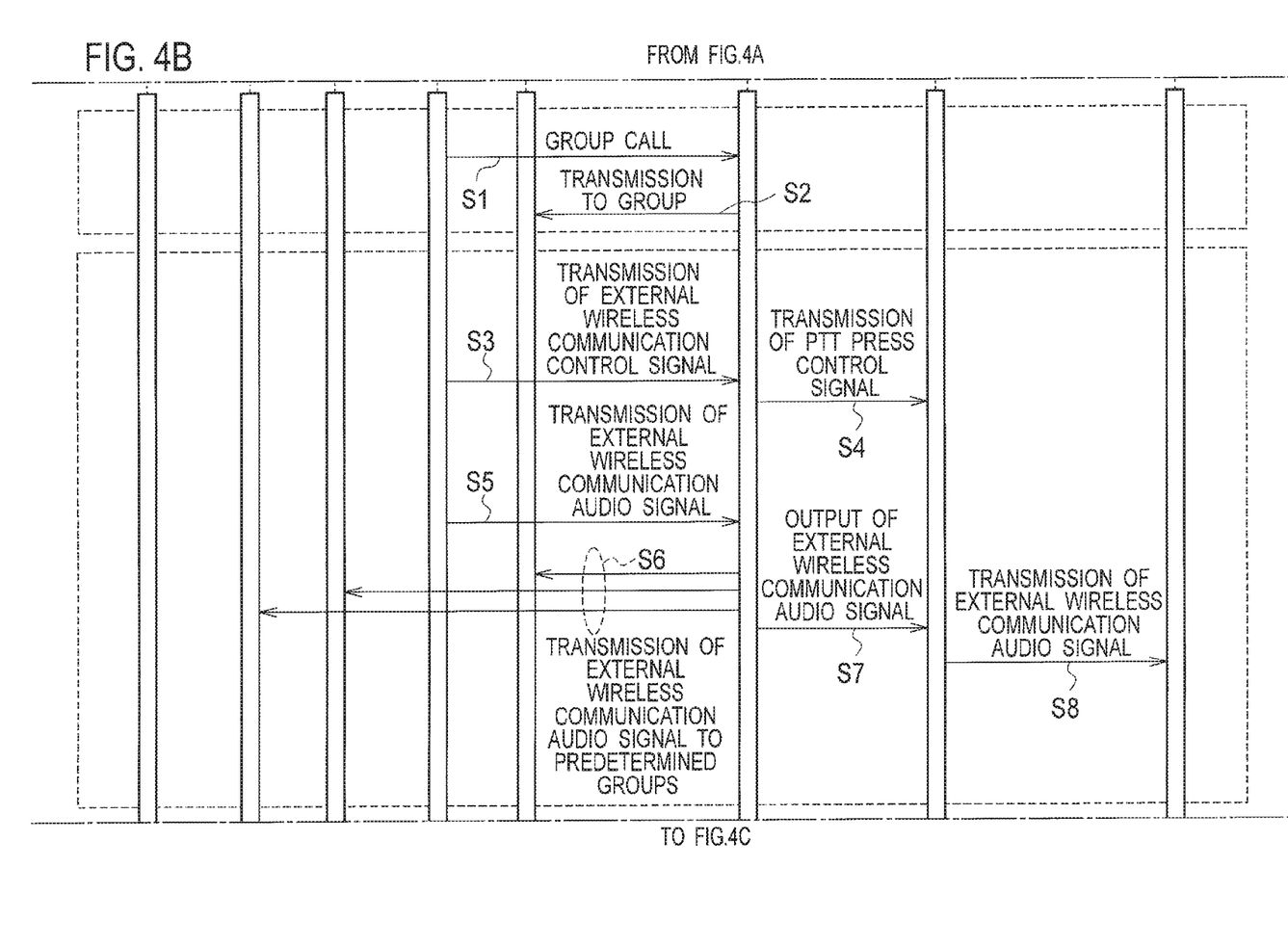
Figure 4C:
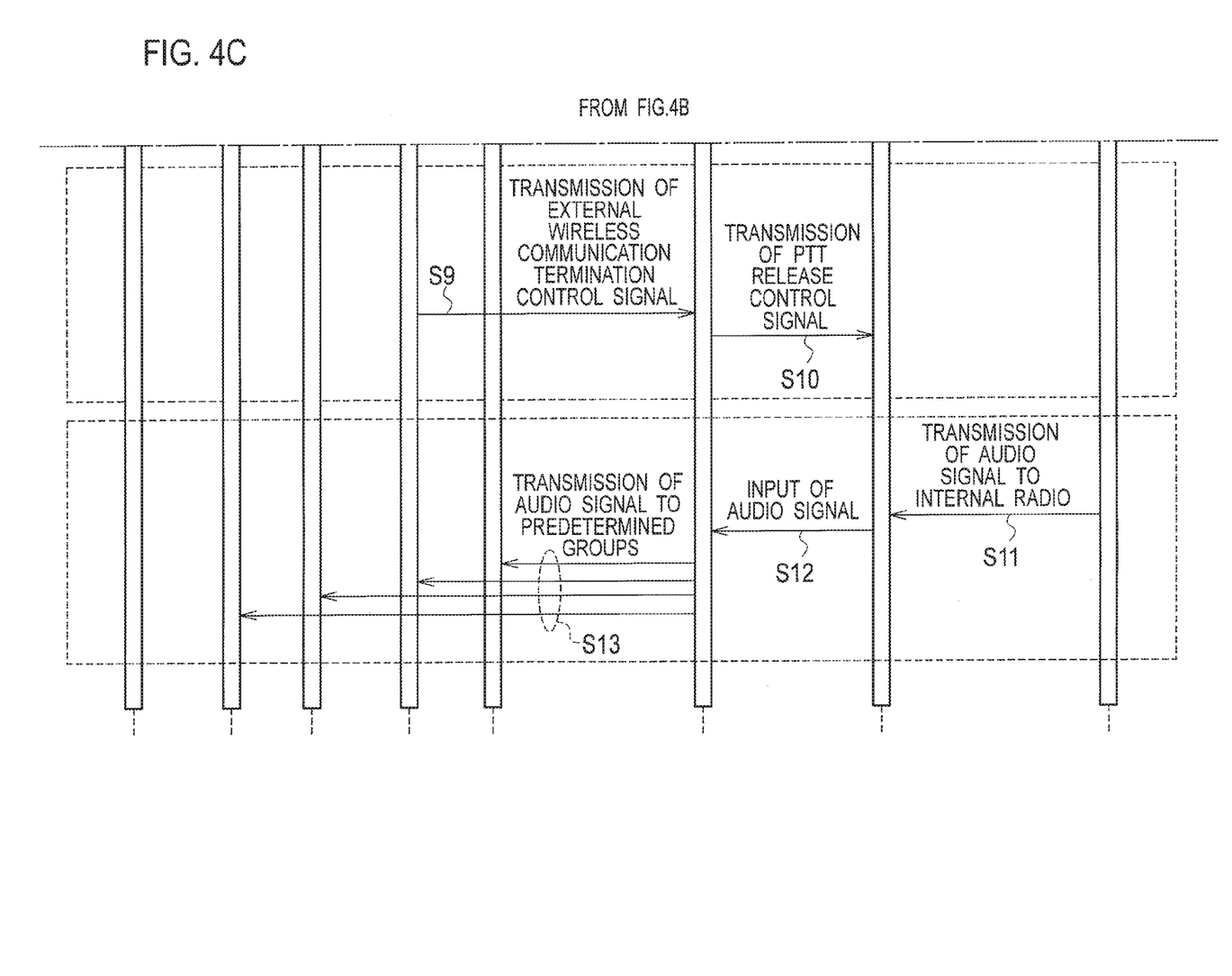

Using the sequence diagram illustrated in FIGS. 4A-4C, a description is further given of the operations of the master station 10, substations 20, internal radio 30, and external radio 40. In this example, the internal radio 30 communicates with only the external radio 40 among the external radios 40 to 60.

The internal radio 30 may be configured to communicate with only the external radio 50 or 60 or communicate with any two of the external radios 40 to 60. The internal radio 30 may be also configured to communicate with all of the external radios 40 to 60 simultaneously.

As an example, when the user of the substation 20a1 in the group GpA presses the call button 22 and emits sound for a group call in step S1, the transmitter 26 transmits an audio signal to the master station 10. The substation 20a1 is a caller of the group call.

The transmitter 14 transmits the audio signal received by the receiver 12 to the other substations 20 (the substation 20a2 herein) in the group GpA (group transmission).

FIG. 1 illustrates a state of the group call and group transmission in the group GpA indicated by the step S1 and S2.

As an example, when the user of the substation 20a1 in the group GpA presses the external wireless communication button 23 in step S3, the transmitter 26 transmits an external wireless communication control signal to the master station 10. The substation 20a1 is set to the external wireless transmission mode.

The master station 10 supplies the PTT press control signal to the internal radio 30 in step S4. The master station 10 is also set to the external wireless transmission mode.

When the user of the substation 20a1 in the group GpA presses the call button 22 and emits sound in step S5, the transmitter 26 transmits the external wireless communication audio signal to the master station 10. The substation 20a1 serves as the caller of the external wireless transmission.

In step S6, under control by the controller 11, the transmitter 14 transmits the external wireless communication audio signal received by the receiver 12 to the substations 20 in groups set for the destination group setting information.

The destination group setting information includes the groups GpA and GpB herein. The controller 11 refers to the destination group setting information and causes the transmitter 14 to transmit the external wireless communication audio signal to the substation 20a2 in the group GpA and the substations 20b1 and 20b2 in the group GpB.

The audio signal input and output unit 16 outputs the external wireless communication audio signal to the internal radio 30 in step S7. Since the internal radio 30 is supplied with the PTT press control signal in the step S4, the internal radio 30 is ready to transmit the external wireless communication audio signal to the wireless system 200. The internal radio 30 transmits the external wireless communication audio signal to the external radio 40 in step S8.

The steps S6 and S7 may be conducted in reverse order or simultaneously.

Figure 5:
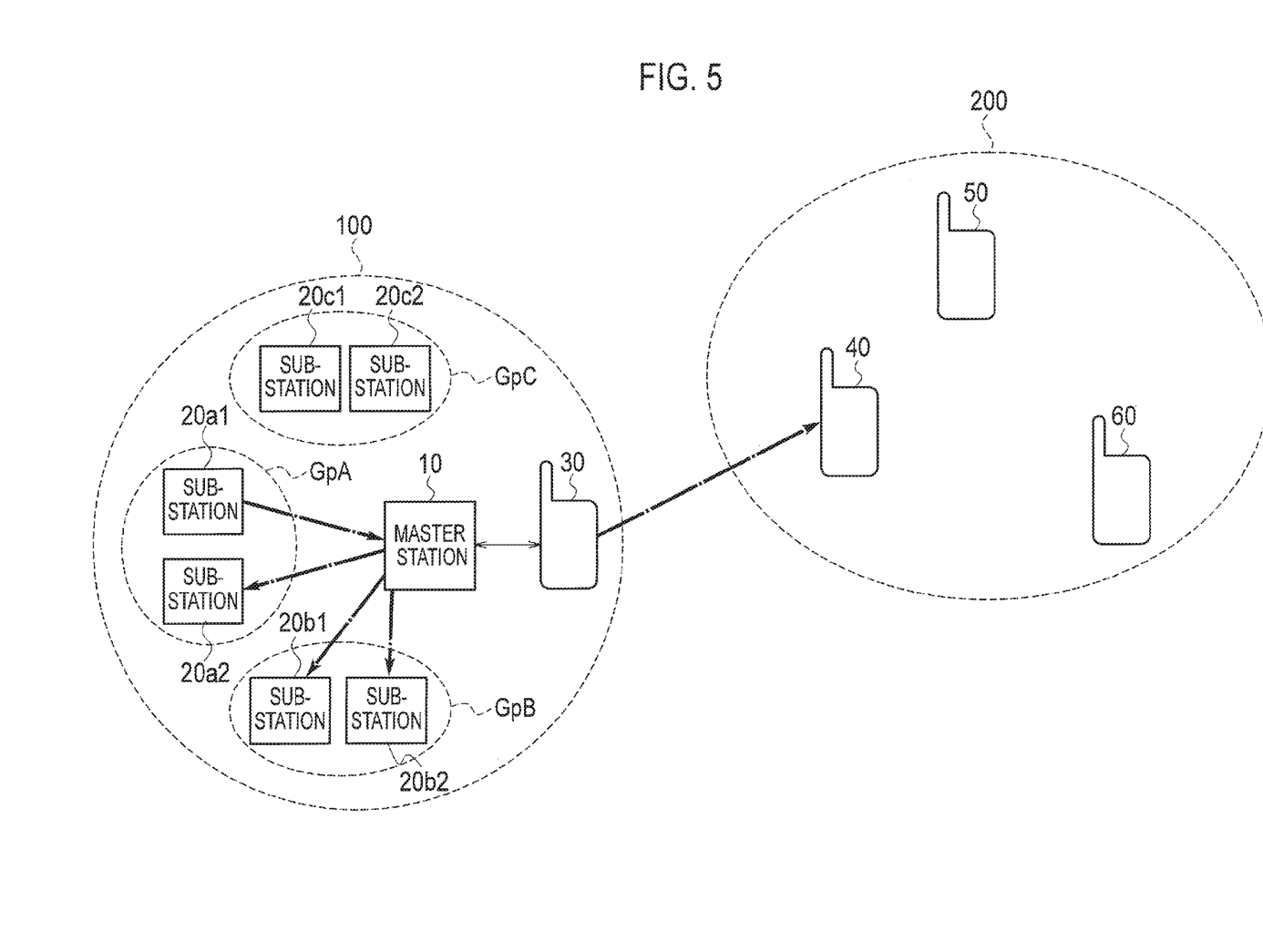
FIG. 5 is a block diagram illustrating an example of transmission of an external wireless communication audio signal from the intercom system according to the embodiment to an external radio of another wireless system.

By the above-described steps S3 to S8, in the intercom system 100, the external wireless communication audio signal from the substation 20a1 is transmitted to the substations 20 in the group set for the destination group setting information and the external radio 40 as illustrated in FIG. 5.

When the user of the substation 20a1 presses the external wireless communication button 23 again in step S9, the transmitter 26 transmits the external wireless communication termination control signal to the master station 10. The master station 10 supplies the PTT release control signal to the internal radio 30 in step S10.

The substation 20a1 and master station 10 are released from the external wireless transmission mode and return to the normal mode.

In step S11, for a call to one of the substations 20 in the intercom system 100, the user of the external radio 40 presses the PTT button to transmit an audio signal to the internal radio 30. The internal radio 30 supplies the received audio signal to the master station 10 in step S12, and the audio signal input and output unit 16 allows the audio signal to be inputted into the master station 10.

The transmitter 14 transmits the audio signal to the substations 20 of the group set for the destination group setting information under control by the controller 11 in step S13.

Figure 6:
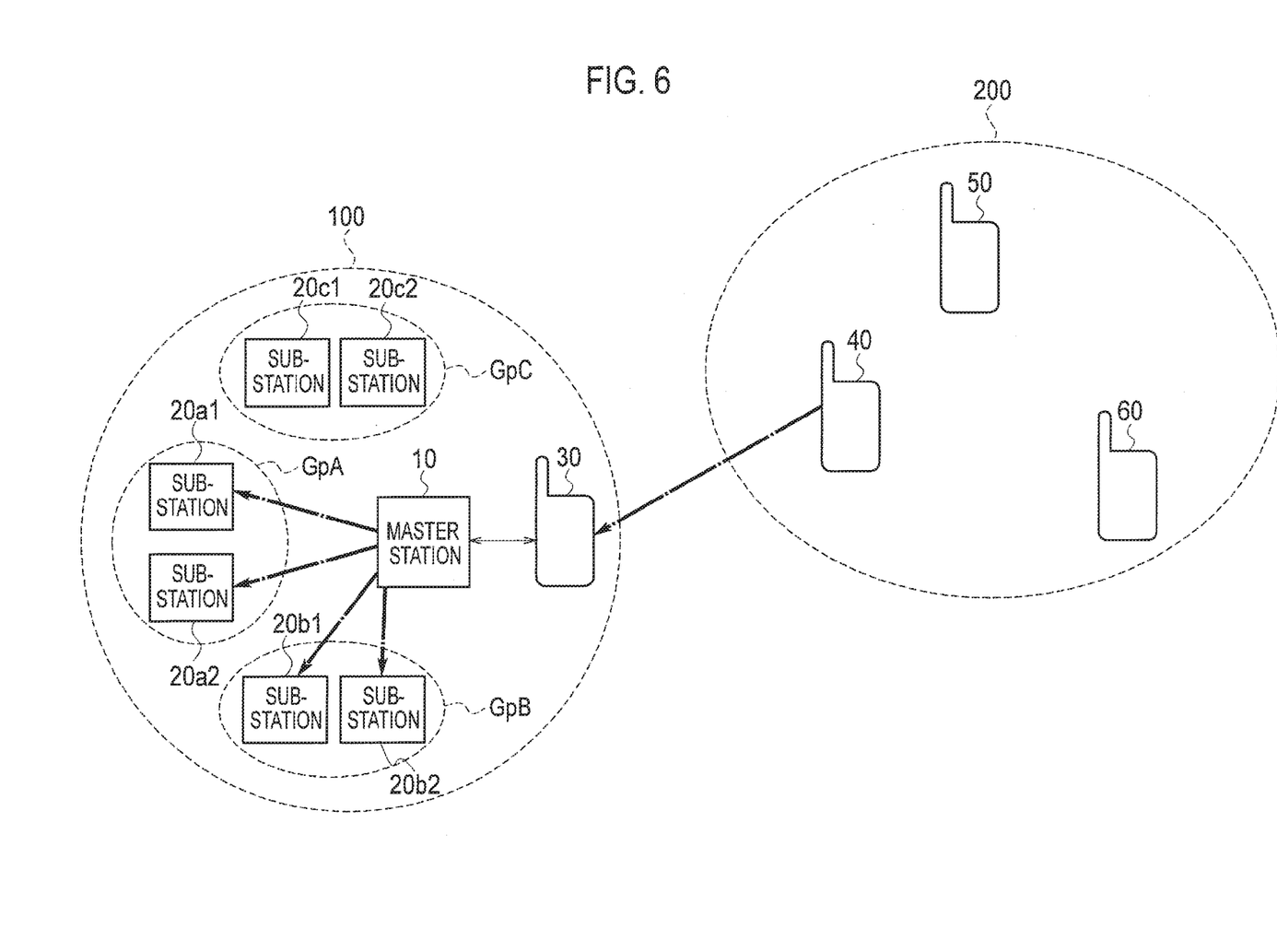
FIG. 6 is a block diagram illustrating reception of an audio signal from an external radio of another wireless system in the intercom system according to the embodiment.

In the above-described steps S11 to S13, as illustrated in FIG. 6, an audio signal from the external radio 40 is transmitted to the substations 20 in the group set for the destination group setting information in the intercom system 100.

Figure 7:
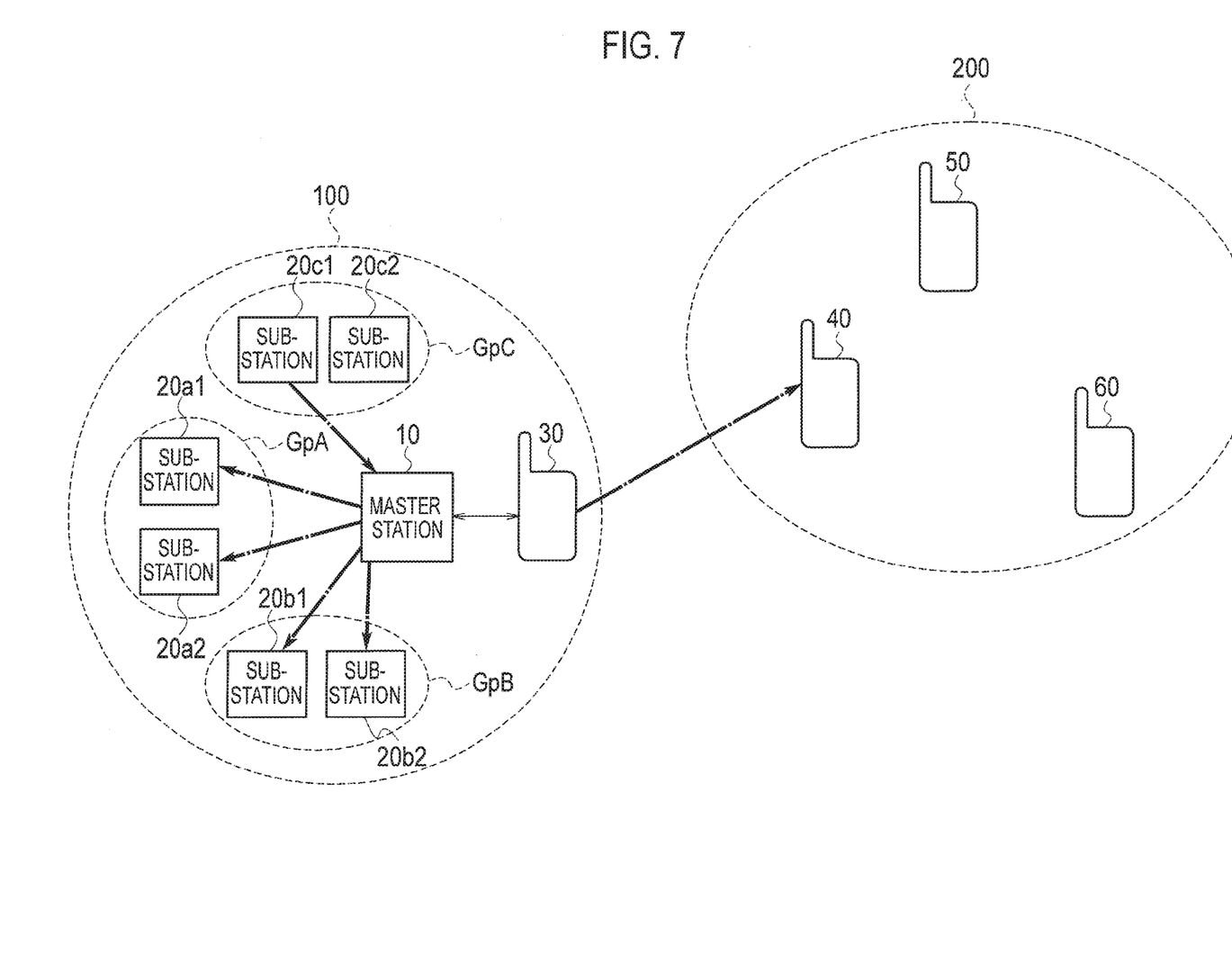
FIG. 7 is a block diagram illustrating another example of transmission of the external wireless communication audio signal from the intercom system according to the embodiment to an external radio of another wireless system.

FIG. 7 illustrates the case where the user of the substation 20c1 in the group GpC presses the external wireless communication button 23, presses the call button 22, and emits sound in a similar manner to the case of FIG. 5. In this case, the external wireless communication audio signal from the substation 20c1 is transmitted via the internal radio 30 to the external radio 40 and is transmitted to the substations 20a1 and 20a2 in the group GpA and the substations 20b1 and 20b2 in the group GpB.

Figure 8:
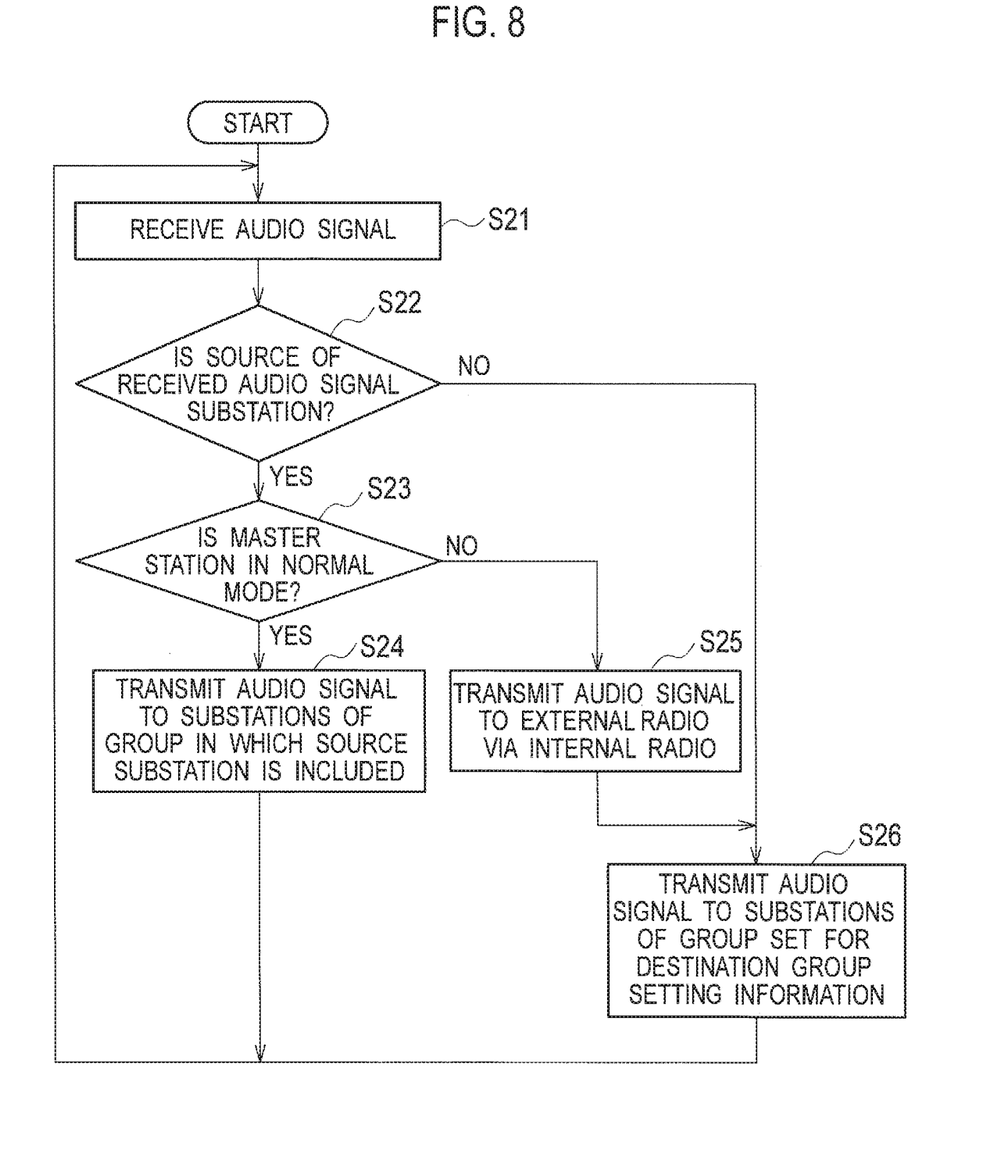
FIG. 8 is a flowchart explaining an operation of the master station constituting the intercom system according to the embodiment.

Using the flowchart of FIG. 8, a description is further given of the operation of the master station 10. In FIG. 8, the master station 10 receives an audio signal in step S21. The controller 11 determines whether the transmission source of the audio signal is one of the substations 20 in step S22. When the transmission source is one of the substations 20 (YES), the controller 11 advances the process to step S23. When the transmission source is not any of the substations 20 (NO), that is, when the transmission source of the audio signal is the internal radio 30, the controller 11 advances the process to step S26.

In step S23, the controller 11 determines whether the master station 10 is set to the normal mode. When the master station 10 is set to the normal mode (YES), in step S24, the controller 11 controls so that the audio signal received in the step S21 is transmitted to the substations 20 in the group in which the source substation 20 is included.

When the master station 10 is not set to the normal mode (NO), that is, is set to the external wireless transmission mode, in step S25, the controller 11 transmits the audio signal received in the step S21, to the external radio 40 via the internal radio 30.

When it is determined that the master station 10 is not set to the normal mode (NO), the audio signal received in the step S21 is the audio signal that the substation 20 intends to transmit to the external radio 40 (50, or 60).

After the step S24, the controller 11 returns the process to the step S21. After the step S25, the controller 11 advances the process to step S26.

In the step S26, the controller 11 controls so that the audio signal received in the step S21 is transmitted to the substations 20 in the group set for the destination group setting information. After the step S26, the controller 11 returns the process to the step S21. The controller 11 repeats the processes of the steps S21 to 26.

The intercom system 100, master station 10, and communication control method according to the embodiment described above provide the following effects.

As illustrated in FIG. 5, sound transmitted from the user of the substation 20a1 to the external radio 40 is transmitted to the substations 20 in the groups GpA and GpB. As illustrated in FIG. 6, an audio signal transmitted from the external radio 40 is similarly transmitted to the substations 20 in the groups GpA and GpB. Accordingly, the users of the substations 20 in the groups GpA and GpB can understand the entire contents of communication conducted between the substation 20a1 and the external radio 40, thus reducing (or avoiding) the probability of confusion.

In FIG. 5, it is assumed that the leader of the group GpA is not the user of the substation 20a1 but is the user of the substation 20a2 and that a member of the group GpB is a superior to the leader of the group GpA. The user of the substation 20a1 transmits a certain message to the user of the external radio 40 instead of the user of the substation 20a2.

The contents of the external wireless communication audio signal transmitted from the user of the substation 20a1 to the external radio 40 are shared by the entirety of the groups GpA and GpB. As illustrated in FIG. 6, the audio signal received from the external radio 40 is transmitted to the substations 20 in the groups GpA and GpB.

The user of the substation 20a2 as the leader of the group GpA and the superior in the group GpB can understand the contents of communication, thus reducing (or avoiding) the probability of confusion.

That applies to the case where the user of the substation 20c1 in the group GpC transmits the external wireless communication audio signal to the external radio 40 as illustrated in FIG. 7.

With the intercom system 100, master station 10, and communication control method according to the embodiment described above, as illustrated in FIG. 3, it is possible to, by using the destination group setting information, properly set a group that shares the contents of communication in which any one of the substations 20 transmits the external wireless communication audio signal.

Accordingly, in an intercom system configured to cooperate with another wireless system, it is possible to reduce (or avoid) the probability of confusion when any one of a plurality of substations communicates with a wireless terminal in another wireless system.

The present invention is not limited to the embodiment described above and can be variously changed without departing from the scope of the present invention. The master station 10 and substations 20 may be composed of hardware or partially composed of software (computer programs). Each component can be implemented by either hardware or software.

What is claimed is:

1. A master station which is provided in an intercom system and is wirelessly connected to a plurality of substations, the master station being connected to an internal radio configured to wirelessly communicate with an external radio provided for a wireless system different from the intercom system, the master station comprising:
   a receiver configured to receive a signal transmitted from any one of the plurality of substations;
   a transmitter configured to transmit an audio signal to one of the plurality of substations;
   a mode setting unit configured to set the master station in either a normal mode or an external wireless transmission mode, the normal mode being the mode in which a caller, which is one of the plurality of substations, communicates with the substations in a group in which the caller is included, the external wireless transmission mode being the mode in which a caller, which is one of the plurality of substations, communicates with the external radio via the master station and the internal radio;
   an audio signal output unit configured, when the master station is set to the external wireless transmission mode and a caller communicates with the external radio via the master station and the internal radio, to output to the internal radio, a first audio signal which is transmitted from the caller and received by the receiver;
   a storage unit configured to store group setting information of the plurality of substations and destination group setting information, the group setting information indicating which substations are included in each group of a plurality of groups, the destination group setting information indicating to which group in the plurality of groups the first audio signal is to be transmitted; and
   a controller configured to cause the transmitter, with reference to the group setting information and the destination group setting information, to transmit the first audio signal to the substations of the group indicated by the destination group setting information.

2. The master station according to claim 1, further comprising an audio signal input unit configured to allow the master station to receive a second audio signal which is transmitted from the external radio and received by the internal radio, wherein
   the controller causes the transmitter, with reference to the group setting information and the destination group setting information, to transmit the second audio signal to the substations in the group represented by the destination group setting information.

3. The master station according to claim 1, further comprising a control signal supply unit configured to supply a press control signal to the internal radio when the receiver receives an external wireless communication control signal from the caller, the external wireless communication control signal being used to set the master station to the external wireless transmission mode for transmission of the first audio signal to the external radio via the master station and the internal radio, the press control signal being used to put the internal radio into the same state as that when a push-to-talk button provided for the internal radio is pressed.

4. A master station, comprising:
   a receiver configured to receive a first audio signal transmitted from a substation of a first wireless communication system, the first audio signal to be transmitted to a radio of a second wireless communication system that is different from the first wireless communication system;
   an audio signal output unit configured to output the first audio signal in order to transmit the first audio signal to the radio;
   an audio signal input unit configured to input a second audio signal from the radio;
   a transmitter configured to transmit an audio signal to one or a plurality of substations;
   a mode setting unit configured to set the master station in an external wireless transmission mode, the external wireless transmission mode being the mode in which the audio signal output unit outputs the first audio signal, and the audio signal input unit receives the second audio signal;
   a storage unit configured to store information for identifying one or the plurality of substations, the information including group setting information of the plurality of substations and destination group setting information, the group setting information indicating which substations are included in each group of a plurality of groups, the destination group setting information indicating to which group in the plurality of groups the first or second audio signal is to be transmitted;
   a controller configured, when the second audio signal is input into the audio signal input unit, to cause the transmitter to transmit the second audio signal to one or the plurality of substations which are identified by the information stored in the storage unit, and configured, when the receiver receives the first audio signal, to cause the audio signal output unit to output the first audio signal, and cause the transmitter to transmit the first audio signal to one or the plurality of substations which are identified by the information stored in the storage unit.

5. An intercom system, comprising:

a master station; and a plurality of substations wirelessly connected to the master station, wherein the master station is connected to an internal radio configured to wirelessly communicate with an external radio provided for a wireless system different from the intercom system, the master station comprises:

a receiver configured to receive an audio signal transmitted from any one of the plurality of substations;

a transmitter configured to transmit an audio signal to any of the plurality of substations;

a mode setting unit configured to set the master station in either a normal mode or an external wireless transmission mode, the normal mode being the mode in which a caller, which is one of the plurality of substations, communicates with the substations in a group in which the caller is included, the external wireless transmission mode being the mode in which a caller, which is one of the plurality of substations, communicates with the external radio via the master station and the internal radio;

an audio signal output unit configured to, when the master station is set to the external wireless transmission mode and a caller communicates with the external radio via the master station and the internal radio, output to the internal radio, a first audio signal which is transmitted from the caller and received by the receiver;

a storage unit configured to store group setting information of the plurality of substations and destination group setting information, the group setting information indicating which substations are included in each group of a plurality of groups, the destination group setting information indicating to which group in the plurality of groups the first audio signal is to be transmitted; and a controller configured, with reference to the group setting information and the destination group setting information, to cause the first transmitter to transmit the first audio signal to the substations of the group indicated by the destination group setting information.

* * * * *